US012779784B2

(12) United States Patent
de Pena et al.

(10) Patent No.: US 12,779,784 B2
(45) Date of Patent: Nov. 3, 2026

(54) CONFIGURING LAYER GENERATION TIME IN ADDITIVE MANUFACTURING

(71) Applicant: Peridot Print LLC, Palo Alto, CA (US)

(72) Inventors: Alejandro Manuel de Pena, Sant Cugat del Valles (ES); Luis Garcia Garcia, Les Roquetes (ES); Salvador Sanchez Ribes, Sabadell (ES)

(73) Assignee: Peridot Print LLC, Palo Alto, CA (US)

( * ) Notice: Subject to any disclaimer, the term of this patent is extended or adjusted under 35 U.S.C. 154(b) by 1451 days.

(21) Appl. No.: 16/081,826

(22) PCT Filed: May 12, 2016

(86) PCT No.: PCT/EP2016/060710

§ 371 (c)(1),
(2) Date: Aug. 31, 2018

(87) PCT Pub. No.: WO2017/194130

PCT Pub. Date: Nov. 16, 2017

(65) Prior Publication Data

US 2021/0178696 A1 Jun. 17, 2021

(51) Int. Cl.
*B29C 64/393* (2017.01)
*B22F 10/85* (2021.01)
(Continued)

(52) U.S. Cl.
CPC ............ *B29C 64/393* (2017.08); *B22F 10/85* (2021.01); *B28B 17/0081* (2013.01); *B33Y 30/00* (2014.12); *B33Y 50/02* (2014.12)

(58) Field of Classification Search
CPC ....... B29C 64/393; B33Y 30/00; B33Y 50/02; B22F 10/85; B28B 17/0081
See application file for complete search history.

(56) References Cited

U.S. PATENT DOCUMENTS 5,496,682 A 3/1996 Quadir et al.
2007/0238056 A1* 10/2007 Baumann ................ B22F 12/41 430/325

(Continued)

FOREIGN PATENT DOCUMENTS

CN 105451970 A 3/2016
CN 105555507 A 5/2016

(Continued)

OTHER PUBLICATIONS

International Search Report and Written Opinion for International Publication No. PCT/EP2016/060710 dated Jan. 23, 2017, 10 pages.

(Continued)

*Primary Examiner* — Larry W Thrower
(74) *Attorney, Agent, or Firm* — Law Offices of Michael Dryja; Michael Dryja

(57) ABSTRACT

In an example an additive manufacturing system for generating a three-dimensional object by processing successive layers of build material comprises a controller to: receive data relating to a three-dimensional object to be generated; calculate, based at least in part on the data relating to the three-dimensional object, an estimated time to process each layer of build material; determine the longest time of said estimated times; and configure the additive manufacturing system to process each layer of build material in a time which is the same, within a predetermined tolerance, for all of the layers, and which is at least as long as the determined longest time.

20 Claims, 5 Drawing Sheets

(51) Int. Cl.

| | |
|---|---|
| ***B28B 17/00*** | (2006.01) |
| ***B33Y 30/00*** | (2015.01) |
| ***B33Y 50/02*** | (2015.01) |

(56) References Cited

U.S. PATENT DOCUMENTS

| | | | | |
|---|---|---|---|---|
| 2008/0174050 | A1 | 7/2008 | Kikuchi | |
| 2013/0270750 | A1 | 10/2013 | Green | |
| 2014/0058959 | A1 | 2/2014 | Isbjornssund et al. | |
| 2015/0251249 | A1 | 9/2015 | Fager | |
| 2018/0329395 | A1* | 11/2018 | Bheda | B29C 64/106 |

FOREIGN PATENT DOCUMENTS

| | | | |
|---|---|---|---|
| EP | 1876012 | A1 | 1/2008 |
| JP | 2001315214 | A | 11/2001 |
| JP | 2013067018 | A | 4/2013 |
| JP | 2015085663 | | 5/2015 |
| KR | 101648282 | B1 | 8/2016 |
| WO | WO0158673 | | 8/2001 |
| WO | WO-2015155745 | | 10/2015 |

OTHER PUBLICATIONS

ProJet® 5000, 3D Systems Webpage, 2015, 5 pages, 3D Systems, Inc.

* cited by examiner

CONFIGURING LAYER GENERATION TIME IN ADDITIVE MANUFACTURING

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Examples will now be described, by way of non-limiting example, with reference to the accompanying drawings, in which.

DETAILED DESCRIPTION

Figure 1:
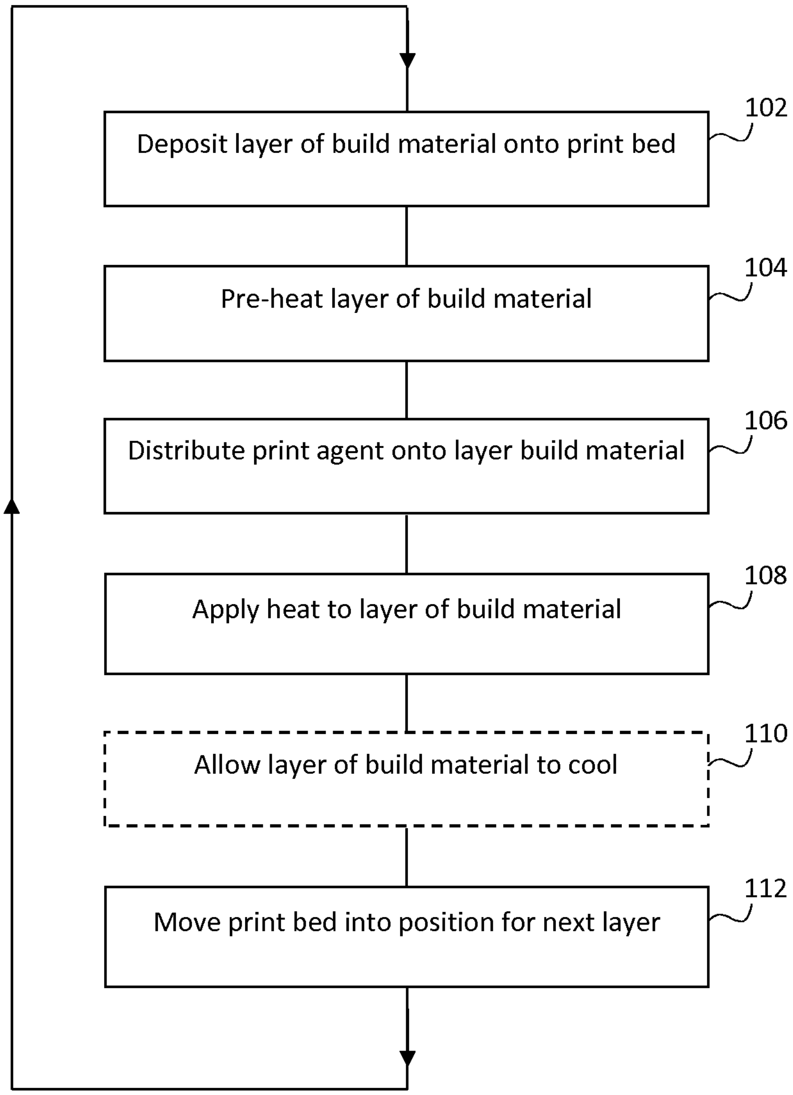
FIG. 1 is a simplified flowchart of an example additive manufacturing process.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In some examples, a print agent may, in addition to a fusing agent, comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a modifying agent, and/or as a print agent to provide a particular color for at least a portion of the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

An example additive manufacturing apparatus may include a print bed, or build platform, onto which a layer of build material may be formed. The print bed may be movable at least in a direction perpendicular to a surface of the print bed (i.e. a z-direction) as is discussed below. The additive manufacturing apparatus may also include a build material distributor to distribute or form build material on the print bed. In some examples, the additive manufacturing apparatus may include at least one source of radiation to direct radiation towards the print bed. The source of radiation may comprise at least one heat lamp, such as an infrared lamp, which may be positioned above the print bed such that radiation is directed downwards towards the print bed. The source of radiation may, in some examples, include at least one pre-heating lamp for pre-heating the build material and/or at least one fusing lamp for applying heat to fuse portions of the build material. The additive manufacturing apparatus may also include an agent distributor to distribute agent, such as fusing agent and/or detailing agent, onto the layer of build material on the print bed. The agent distributor may include at least one set of nozzles through which the print agent may be distributed onto the build material, each set of nozzles having at least one individual nozzle. The nozzles and/or the sets of nozzles may form part of a print head which, in some examples, may be a thermal print head or a piezo print head. The agent distributor may be movable relative to the print bed such that print agent may be selectively deposited, for example drop-by-drop, onto a portion of the layer of build material in a pattern derived from data representing a slice of the three-dimensional object to be built.

FIG. 1 is a simplified schematic flow diagram of an example additive manufacturing process. In block 102, a layer of build material may be deposited onto a print bed. The build material may be distributed or spread onto the print bed in a thickness derived from data relating to the object to be built. In some examples, the layer of build material may be formed having a thickness of between around 80 microns and 100 microns.

The layer of build material may be preheated in block 104. Preheating the build material increases the temperature of build material so as to reduce the amount of power to be used by the fusing lamps to fuse portions of the build material. Preheating the build material may also reduce thermal gradients within the layer of build material after the fusing process. Pre-heating may be achieved using a radiation source such as an infrared lamp, as discussed above, or by some other means. In block 106, print agent such as fusing agent and/or detailing agent may be distributed onto the layer of build material by the agent distributor. As noted above, print agent may be selectively deposited onto a portion of the layer of build material in a pattern representing a slice of the three-dimensional object to be built. The amount of print agent distributed onto the build material may be derived from data relating to the object to be built, and may be related, for example, to adjacent slices of the object. Energy, for example heat, may be applied to the layer of build material in block 108, so as to cause coalescence and solidification of those portions of build material to which fusing agent has been applied. The energy applied in block 108 may be applied by at least one fusing lamp. The amount of energy applied to the layer of build material may be sufficient to increase the temperature of those portions onto which fusing agent has been distributed to a temperature at which the build material in those portions coalesces and solidifies. The build material in those portions of the layer onto which fusing agent has not been distributed may not coalesce and solidify. In a further example, the layer of build material may, in block 110, be allowed to cool down. In some examples, the cooling down process may be omitted, so block 110 is shown as a dashed line to denote this option. In block 112, the print bed may be moved or retracted, for example downwards, so that a subsequent layer of build material may be distributed or spread onto the previous layer. The process may continue by depositing the next layer of build material, as in block 102, and so on, until the final, or top, slice of the object has been generated.

The processes described above with reference to blocks 102 to 112 form part of a layer processing cycle which may be repeated for each layer of build material to generate the object. The layer processing cycle, or layer generation cycle, may be considered to include a set of processes performed in respect of a single layer of build material so as to form a slice of the three-dimensional object to be built, and the time to perform the set of processes in respect of a single layer of build material may be considered to be a layer processing time, or layer generation time. In some examples, at least one layer of an object may include no portions of build material to be fused. Such layers may be processed, for example, without any fusing agent and/or without any detailing agent being deposited onto the build material. In such cases, the agent distributor may not be moved over the print bed and, therefore, the time to perform the print agent distribution process (described above in block 106) for that particular layer may be less than for other layers. In other examples, the processing time for different layers may differ if, for example, the time to preheat the build material of different layers to an intended temperature varies. This might happen if, for example, the build material is formed in different layers at different temperatures. Processing times may also vary between layers if, for example, forming a layer of build material takes longer than intended, for example if the build material supply becomes interrupted. More generally, the time taken to perform individual processes in the processing cycle may vary from layer to layer. A variation in processing times for individual processes between different layers may, for example, cause heating profiles in the build material to vary between layers. For example, if a particular process of a layer processing cycle is shorter or omitted altogether for a particular layer, then the amount of heat applied to the build material of that layer, both from the pre-heating process and from the fusing process may be different compared to other layers. Such differences may cause unintended local heat fluctuations in the build material of other layers of build material due in part, for example, to a large heat inertia, or residual heat, in the heating lamps. A variation in processing times of individual processes in different layers might also cause a variation in the total processing time for different layers. However, as is discussed below, it is intended that the total layer processing time, and the processing time for each corresponding process in the layer processing cycle, does not vary between layers of the object.

It is intended that the layer processing time, in some examples, may be the same or approximately the same for all of the layers of build material to be processed. That is to say, the layer processing time for each layer in an additive manufacturing process may be approximately constant or fixed. Here, the expression "the same" is intended to mean exactly the same or approximately the same. In some examples, the layer processing time for each of the layers may be set to a particular intended time which may be the same, within a predetermined tolerance, for all layers, and which may be determined prior to the commencement of the generation process, as discussed below. In some examples, the predetermined tolerance may plus or minus ten percent of a predetermined intended time. In other examples, the predetermined tolerance may plus or minus five percent of a predetermined intended time. If the layer processing time for a particular layer in an additive manufacturing process is too long relative to the intended constant layer processing time, for example if a layer of build material is heated up by a heat lamp for too long during a pre-heating process, then the build material may become hotter than intended, and a portion of build material may be caused to fuse or coalesce, even if fusing agent has not been applied to that portion. If portions of the build material that are not intended to fuse become fused, then the resulting object may, for example, include an artefact or mechanical defect. Maintaining a constant or approximately constant layer processing time for all layers of build material to be processed helps to ensure that the object is generated with consistent layers.

Figure 2:
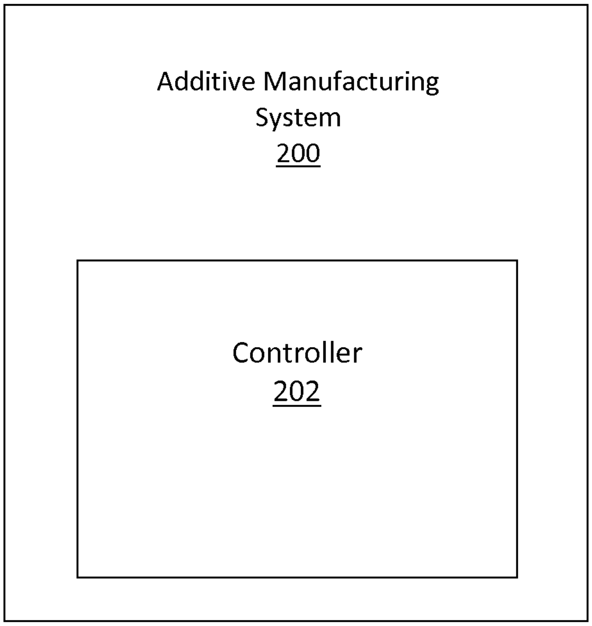
FIG. 2 is a simplified schematic of an example additive manufacturing system.

FIG. 2 is a simplified schematic of an example additive manufacturing system 200. The additive manufacturing system 200 comprises a controller 202. The controller 202 may comprise at least one processor or processing apparatus for controlling the system 200. The controller 202 may be to carry out the method described below with reference to FIG. 3.

Figure 3:
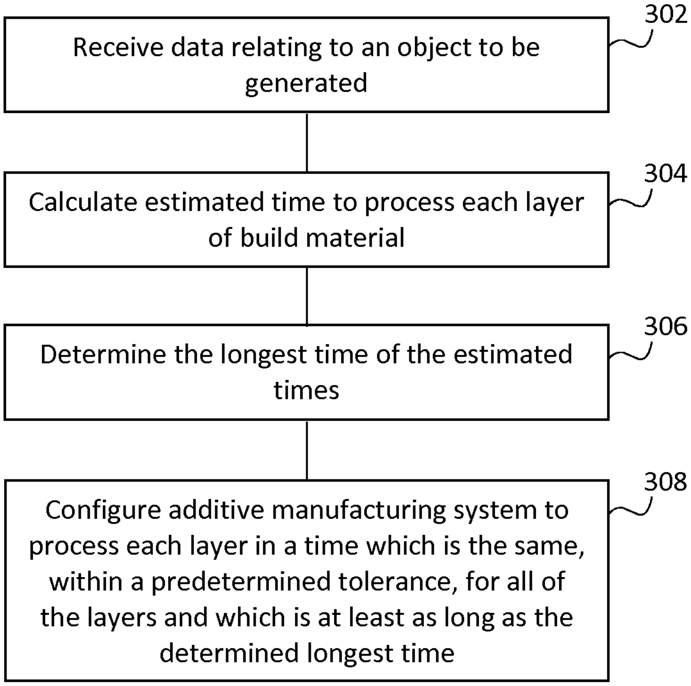
FIG. 3 is a simplified flowchart of an example of a method of configuring an additive manufacturing system.

FIG. 3 is a simplified flowchart of an example of a method of configuring an additive manufacturing system. The method may be performed by the controller 202. According to an example, the controller 202, in block 302, may receive data relating to a three-dimensional object to be generated by an additive manufacturing system in a layer-by-layer process. The data may be object model data representing at least a portion of the object to be generated by fusing portions layers of build material. The data may, for example, comprise a Computer Aided Design (CAD) model, and/or may be a STereoLithographic (STL) data file. In some examples, the data may be in at least one of the following formats: Extensible Markup Language (XML), Virtual Reality Modeling Language (VRML), object (OBJ), Additive Manufacturing File Format (AMF), and 3D Manufacturing Format (3MF). In other examples, the data may be in another format.

Information to be used by the additive manufacturing system may be included in the data received in block 202, or may by derivable from the received data, for example by at least one processor. The data may, for example, include information describing at least one of the following: a size of at least a portion of the object to be generated, a shape of at least a portion of the object to be generated, a shape of at least a portion of a layer of the object, a dimension of at least a portion of the object, a dimension of a layer of the object, an amount of build material to be used to generate at least a portion of a layer of the object, an amount of print agent to be used to generate at least a portion of a layer of the object, and information describing at least one colour of build material and/or of print agent to be used to generate at least a portion of a layer of the object.

Details relating to the object to be generated may affect the time that an additive manufacturing system takes to perform the processes in a single layer processing cycle. For example, performing the processes of a single layer processing cycle may take a longer time for a layer of the object onto which a relatively larger amount of fusing agent is to be distributed than for a layer onto which a relatively smaller amount of fusing agent is to be distributed, for example due to the amount of heat required to fuse the relatively larger of build material to which fusing agent has been applied. In another example, performing the processes of a single layer processing cycle may take a longer time if the layer includes relatively small features. In another example, performing the processes of a single layer processing cycle may take a longer time for a layer of the object onto which detailing agents of multiple colors are to be distributed than for a layer onto which a detailing agent of one color, or not detailing agent at all, is to be distributed.

In block 304, the controller may calculate, based at least in part on the data relating to the three-dimensional object, received in block 302, an estimated time to process each layer of build material. In other words, for each layer of build material to be processed, the method may use the received data to estimate a layer processing time.

As discussed above, to process each layer of build material, various processes are performed by the additive manufacturing system. In some examples, the estimated time to process each layer is calculated based on the estimated time to at least: move a print bed of the additive manufacturing system; form a layer of build material on the print bed; heat the layer of build material to a first temperature; distribute print agent onto at least a portion of the layer of build material; and heat the layer of build material to a second temperature. In a further example, the estimated time may be calculated based additionally on the time to cool the layer of the build material to below a third temperature.

The first temperature may be slightly below the temperature at which those portions of build material upon which fusing agent has been deposited begin to fuse. The second temperature may be slightly above the temperature at which those portions of build material upon which fusing agent has been deposited begin to fuse. In some examples, the third temperature may be the same as the first temperature.

The controller may, in block 306, determine the longest time of the estimated times calculated in block 304. The processes discussed herein may, in some examples, each be performed by a separate controller, processor or processing apparatus. In other examples, the processes may all be performed by a single controller, processor or processing apparatus. In some other examples, the processing tasks may be shared among multiple controllers or processors.

In block 308, the method comprises configuring the additive manufacturing system to process each layer of build material in a time which is the same, within a predetermined tolerance, for all of the layers, and which is at least as long as the determined longest time. In this way, the additive manufacturing system may be programmed or configured such that the processing of each layer is to take the same time, or approximately the same time, which is at least as long as the longest time from the times estimated in block 304. The predetermined tolerance may, in some examples, be a tolerance of plus or minus five percent. As discussed above, maintaining a constant or approximately constant layer processing time for all of the layers of build material to be processed may cause the resulting object to have consistent layers.

Figure 4:
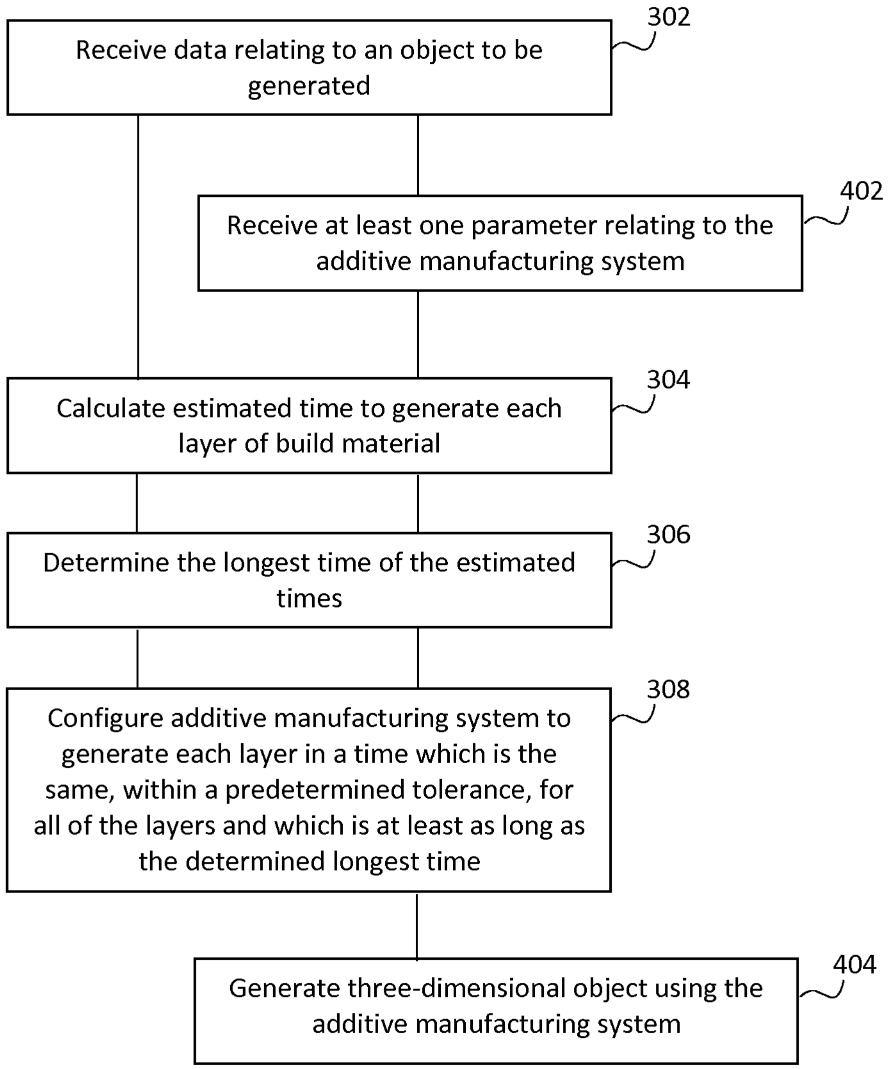
FIG. 4 is a simplified flowchart of a further example of a method of configuring an additive manufacturing system.

FIG. 4 is a flowchart of an example of a method of configuring an additive manufacturing system, which method may be carried out by the controller 202. FIG. 4 includes blocks 302 to 308 discussed above with reference to FIG. 3, and includes some additional blocks. At block 402, the controller, in some examples, may receive at least one parameter relating to the additive manufacturing system. The at least one parameter may include at least one of the following: a quality of generation of the object; a speed of generation of the object; a color of at least a portion of the object; a mechanical property of at least a portion of the object; a surface structure or texture of at least a portion of the object; and an internal structure of at least a portion of the object. In some examples, a quality of generation of an object may be chosen based on at least one of the following: mechanical properties of the object to be generated, cosmetic properties of the object to be generated, and accuracy of the additive manufacturing system in generating the object. In an example in which plastics material is used to generate an object in the additive manufacturing system (wherein the build material may comprise plastics material), then the at least one parameter may include the type of plastics material to be used. In a more general sense, the at least one parameter may include information, data or at least one criterion or setting indicative of a preference or desire relating to the additive manufacturing system or components thereof, either before, during or after the object has been generated, or relating to build material to be used by the additive manufacturing system to generate the object.

In one example, a parameter relating to the speed of the object generation and the quality of the object to be generated may be received at block 402. In such an example, a parameter may indicate that the object is to be generated at a high quality, for example with relatively finer detail, and greater resolution. As a consequence, the speed of generation of the object may be relatively low. In another example, the parameter may indicate that the object is to be generated at a low quality, for example with relatively coarser detail, and lower resolution. As a consequence, the speed of generation of the object may be relatively high. In some examples, the at least one parameter may be selected by a user while, in other examples, the at least one parameter may be pre-set or pre-determined.

As is clear from FIGS. 3 and 4, the calculating of block 304 may be based on data relating to the object to be generated, received at block 302. In other examples, however, and as exemplified by FIG. 4, the calculating of block 304 may additionally be based on the at least one parameter relating to the additive manufacturing system, received at block 402.

The process of configuring the additive manufacturing system, as described in block 308, may include at least one of: configuring a power of at least one heating lamp of the additive manufacturing system, configuring a rate of temperature change of at least one heating lamp of the additive manufacturing system, configuring a rate of deposition of an agent by an agent distributor of the additive manufacturing system, configuring a rate of movement of an agent distributor of the additive manufacturing system, configuring a rate of movement of a build material distributor, and configuring a rate of cooling of a processed layer of build material. More generally, the configuring process may include planning or scheduling various processes to be performed by various components of the additive manufacturing system in a particular manner, and/or for a particular duration, to minimise the variation between layer processing times.

In some examples, the configuring may comprise configuring an output power of at least one heating lamp, such as a pre-heating lamp or a fusing lamp, and/or configuring the duration of application of heat by the at least one heating lamp. In other examples, the configuring may comprise configuring how quickly the agent distributor moves into position relative to the print bed, and/or whether the agent distributor deposits print agent during a single pass over the print bed or during multiple passes over the print bed. In some examples, a particular layer of the object to be generated may include a relatively large portion of build material to which fusing agent is to be applied. When applying fusing agent to such a layer, the agent distributor may become hotter than when it applies agent to other layers. Following an application of agent to such a large portion of build material the agent distributor may undergo a relatively longer cooling period to allow the temperature of the agent distributor to reduce to an intended temperature. Therefore, in some examples, the configuring may comprise configuring a rest, or idle, time of at least one component of the additive manufacturing system, for example, the agent distributor.

The method may further comprise, in block 404, generating the three-dimensional object using the additive manufacturing system. The processing of each layer of build material so as to generate the object may be performed in accordance with the configuring performed in block 308.

In some examples of the method, the estimated time to process each layer is calculated based on the estimated time to perform at least a first process and a second process. The first and second processes may, for example, be processes of the layer processing cycle discussed above. The method may further comprise configuring the additive manufacturing system such that a time to perform the first process is the same, within a predetermined tolerance, for each layer, and a time to perform the second process is the same, within a predetermined tolerance, for each layer. In other words, the time to perform a particular process may be the same, within a predetermined tolerance, for each layer of the object. In some examples, the predetermined tolerance may be plus or minus five percent.

An individual process of a layer processing cycle for a particular layer may, in some examples, be performed more quickly than the predetermined time allotted or intended for that process. Thus, there may be a period of time during the layer processing cycle during which at least a portion of the additive manufacturing system is inactive, in an idle state.

Figure 5:
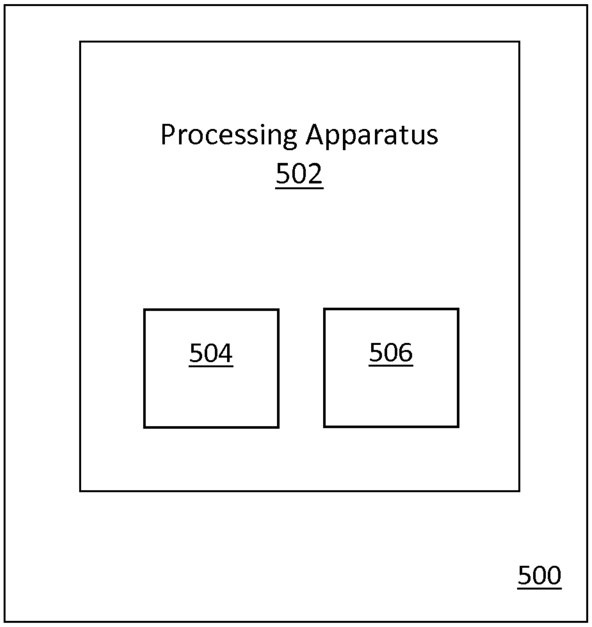
FIG. 5 is a simplified schematic of an example of apparatus for configuring an additive manufacturing apparatus.

FIG. 5 shows an apparatus 500 having processing apparatus 502 which may, for example, comprise at least one processor. The processing apparatus 502 comprises an estimation module 504 and a configuration module 506. In some examples, the estimation module 504 is to estimate, based at least in part on data relating to a three-dimensional object to be generated by an additive manufacturing apparatus by processing successive layers of build material, a time to process each layer of build material. The configuration module 506 is, in some examples, to configure the additive manufacturing apparatus to process each layer of build material in a time which is the same, within a predetermined tolerance, for all of the layers, and which is at least as long as a longest time of said estimated times.

The estimation module 504 may, in some examples, be to estimate the time to process each layer of build material based at least in part on at least one criterion relating to the additive manufacturing apparatus. As discussed above, the at least one criterion, or parameter, may be a setting or preference relating to the performance of the additive manufacturing apparatus, or to the quality of the object to be generated.

In some examples, the predetermined tolerance may be a tolerance of plus or minus five percent of the predetermined intended layer generation, or processing, time. For example, if it is determined the longest layer processing time of the estimated times is 30 seconds, then the configuration module 506 may configure the additive manufacturing apparatus to process each layer of build material in a time ranging from between 28.5 seconds (−5%) and 31.5 seconds (+5%).

Figure 6:
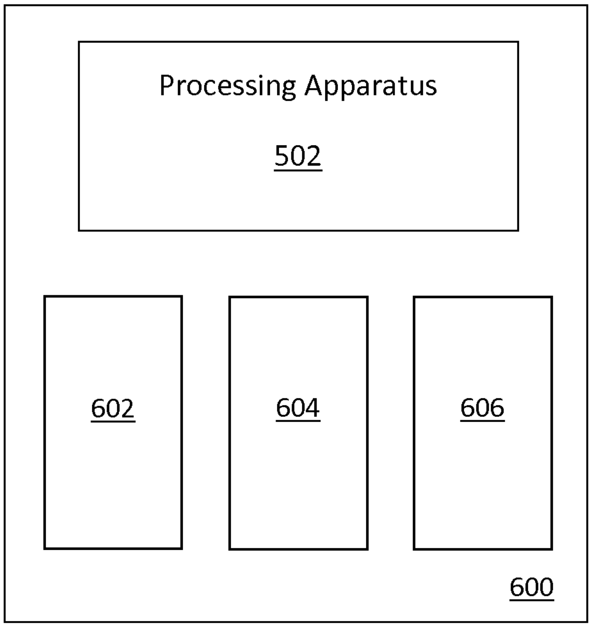
FIG. 6 is a simplified schematic of a further example of apparatus for configuring an additive manufacturing apparatus.

FIG. 6 shows an apparatus 600 for configuring an additive manufacturing apparatus. The apparatus 600 may comprise the processing apparatus 502 discussed above and may further comprise, for example, a print bed 602 to receive a layer of build material; an agent distributor 604 to distribute print agent onto a layer of build material on the print bed; and at least one heater 606 to apply heat to the layer of build material. In some examples, the apparatus 600 may comprise an additive manufacturing apparatus. In other examples, the apparatus 600 may be apparatus such as computing apparatus which may be connected to or remote from an additive manufacturing apparatus, and which may be used to configure and/or control the additive manufacturing apparatus.

Figure 7:
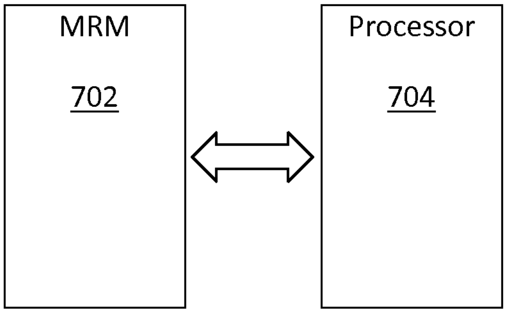
FIG. 7 is a simplified schematic of an example machine readable medium with a processor.

FIG. 7 shows a machine readable medium 702 associated with a processor 704. The machine readable medium 702 comprises instructions which, when executed by the processor 704, cause the processor 704 to determine, based at least in part on object data representing a three-dimensional object to be generated by an additive manufacturing apparatus by processing successive layers of build material, and at least in part on parameters relating to the additive manufacturing apparatus, an estimated time to process each layer of build material and control the additive manufacturing apparatus to process each layer of build material in a time which is constant, within a predetermined tolerance, for all of the layers, and which is at least as long as a longest time of said estimated times.

The machine readable medium 702 may comprise instructions which, when executed by a processor 704, cause the processor 704 to control at least one of: a power of at least one heating lamp of the additive manufacturing apparatus, a rate of temperature change of at least one heating lamp of the additive manufacturing apparatus, a rate of deposition of an agent by an agent distributor of the additive manufacturing apparatus, a rate of movement of an agent distributor of the additive manufacturing apparatus, and a rate of cooling of a processed layer of build material.

The processes discussed herein may, in some examples, each be performed by, or caused to perform by, a separate controller, processor or processing apparatus. In other examples, the processes discussed herein may all be performed by, or caused to perform by, a single controller, processor or processing apparatus. In other examples, the processes discussed herein may be shared among multiple controllers, processors or processing apparatus.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An additive manufacturing system comprising:

a processor; and a memory storing instructions that when executed by the processor, cause the processor to:

receive three-dimensional object data;

determine a plurality of estimated times to produce a plurality of successive layers to print an object based on the three-dimensional object data, wherein each estimated time specifically corresponds to production of a different layer in the plurality of successive layers and comprises:

an estimated time to, at least, distribute build material on a print bed, distribute print agent onto at least a portion of the build material, and heat the build material to a second temperature to produce each layer of the plurality of successive layers;

determine one estimated time having a longest time duration from the plurality of estimated times;

prior to printing the object, configure the additive manufacturing system to produce each layer in the plurality of successive layers using one particular time that is within a predetermined tolerance of the one estimated time having the longest time duration and that is at least as long as the one estimated time having the longest time duration; and based on configuring the additive manufacturing system, process the three-dimensional object data for each layer in the plurality of successive layers using the one particular time in order to cause printing of the object.

2. The additive manufacturing system of claim 1, wherein the instructions, when executed by the processor, further cause the processor to:

receive at least one parameter relating to the additive manufacturing system, wherein each estimated time is calculated based at least in part on the at least one parameter.

3. The additive manufacturing system of claim 1, wherein the additive manufacturing system is configured by one or more than one of:

configuring a power of at least one heating lamp of the additive manufacturing system;

configuring a rate of temperature change of the at least one heating lamp of the additive manufacturing system;

configuring a rate of deposition of an agent by an agent distributor of the additive manufacturing system;

configuring a rate of movement of the agent distributor of the additive manufacturing system;

configuring a rate of movement of a build material distributor of the additive manufacturing system; and configuring a rate of cooling of a processed layer of the build material.

4. The additive manufacturing system of claim 1, wherein the predetermined tolerance comprises a tolerance of plus or minus five percent.

5. The additive manufacturing system of claim 1, wherein the three-dimensional object data comprises data selected from a group comprising:

a size of at least a portion of the object to be generated;

a shape of at least the portion of the object to be generated;

a shape of at least a portion of a layer of the object;

a dimension of at least the portion of the object;

a dimension of the layer of the object an amount of the build material to be used to generate at least the portion of the layer of the object;

an amount of the print agent to be used to generate at least the portion of the layer of the object; and information describing at least one color of either or both of the build material and the print agent to be used to generate at least the portion of the layer of the object.

6. The additive manufacturing system of claim 2, wherein the at least one parameter comprises a parameter selected from a group comprising:

a quality of generation of the object;

a speed of the generation of the object;

a color of at least a portion of the object;

a mechanical property of at least the portion of the object;

a surface structure or texture of at least the portion of the object; and an internal structure of at least the portion of the object.

7. The additive manufacturing system of claim 1, wherein each estimated time is calculated based on an estimated time to perform at least a first process and a second process that are part of a layer processing cycle which is repeated for each layer of the plurality of successive layers, and wherein the instructions, when executed by the processor, further cause the processor to:

configure the additive manufacturing system such that a time to perform the first process is the same, within the predetermined tolerance, for each layer, and a time to perform the second process is the same, within the predetermined tolerance, for each layer.

8. The additive manufacturing system of claim 1, wherein the three-dimensional object data comprises at least a dimension of each layer of the successive layers of the build material and an amount of the build material to be used to generate each layer of the successive layers of the build material.

9. A method comprising:

receiving, by a processor, three-dimensional object data;

determining, by the processor, a plurality of estimated times to produce a plurality of successive layers to print an object based on the three-dimensional object data, wherein each estimated time specifically corresponds to production of a different layer in the plurality of successive layers and comprises:

an estimated time to, at least, distribute build material on a print bed, distribute print agent onto at least a portion of the build material, and heat the build material to a second temperature to produce each layer of the plurality of successive layers;

determining, by the processor, one estimated time having a longest time duration from the plurality of estimated times;

prior to printing the object, configuring, by the processor, an additive manufacturing system to produce each layer in the plurality of successive layers using one particular time that is within a predetermined tolerance of the one estimated time having the longest time duration and that is at least as long as the one estimated time having the longest time duration; and based on configuring the additive manufacturing system, processing, by the processor, the three-dimensional object data for each layer in the plurality of successive layers using the one particular time in order to cause printing of the object.

10. The method of claim 9, further comprising:

receiving, by the processor, at least one parameter relating to the additive manufacturing system, wherein each estimated time is calculated based at least in part on the at least one parameter.

11. The method of claim 9, wherein configuring the additive manufacturing system comprises one or more than one of:

configuring a power of at least one heating lamp of the additive manufacturing system;

configuring a rate of temperature change of the at least one heating lamp of the additive manufacturing system;

configuring a rate of deposition of an agent by an agent distributor of the additive manufacturing system;

configuring a rate of movement of the agent distributor of the additive manufacturing system;

configuring a rate of movement of a build material distributor of the additive manufacturing system; and configuring a rate of cooling of a processed layer of the build material.

12. The method of claim 9, wherein the predetermined tolerance comprises a tolerance of plus or minus five percent.

13. The method of claim 9, wherein the three-dimensional object data comprises data selected from a group comprising:

a size of at least a portion of the object to be generated;

a shape of at least the portion of the object to be generated;

a shape of at least a portion of a layer of the object;

a dimension of at least the portion of the object;

a dimension of the layer of the object;

an amount of the build material to be used to generate at least the portion of the layer of the object;

an amount of the print agent to be used to generate at least the portion of the layer of the object; and information describing at least one color of either or both of the build material and the print agent to be used to generate at least the portion of the layer of the object.

14. The method of claim 10, wherein the at least one parameter comprises a parameter selected from a group comprising:

a quality of generation of the object;

a speed of the generation of the object;

a color of at least a portion of the object;

a mechanical property of at least the portion of the object;

a surface structure or texture of at least the portion of the object; and an internal structure of at least the portion of the object.

15. A non-transitory machine-readable medium storing instructions executable by a processor to perform processing comprising:

receiving three-dimensional object data;

determining a plurality of estimated times to produce a plurality of successive layers to print an object based on the three-dimensional object data, wherein each estimated time specifically corresponds to production of a different layer in the plurality of successive layers and comprises:

an estimated time to, at least, distribute build material on a print bed, distribute print agent onto at least a portion of the build material, and heat the build material to a second temperature to produce each layer of the plurality of successive layers;

determining one estimated time having a longest time duration from the plurality of estimated times;

prior to printing the object, configuring an additive manufacturing system to produce each layer in the plurality of successive layers using one particular time that is within a predetermined tolerance of the one estimated time having the longest time duration and that is at least as long as the one estimated time having the longest time duration; and based on configuring the additive manufacturing system, processing the three- dimensional object data for each layer in the plurality of successive layers using the one particular time in order to cause printing of the object.

16. The non-transitory machine-readable medium of claim 15, wherein the processing further comprises:

receiving at least one parameter relating to the additive manufacturing system, wherein each estimated time is calculated based at least in part on the at least one parameter.

17. The non-transitory machine-readable medium of claim 15, wherein configuring the additive manufacturing system comprises one or more than one of:

configuring a power of at least one heating lamp of the additive manufacturing system;

configuring a rate of temperature change of the at least one heating lamp of the additive manufacturing system;

configuring a rate of deposition of an agent by an agent distributor of the additive manufacturing system;

configuring a rate of movement of the agent distributor of the additive manufacturing system;

configuring a rate of movement of a build material distributor of the additive manufacturing system; and configuring a rate of cooling of a processed layer of the build material.

18. The non-transitory machine-readable medium of claim 15, wherein the predetermined tolerance comprises a tolerance of plus or minus five percent.

19. The non-transitory machine-readable medium of claim 15, wherein the three-dimensional object data comprises data selected from a group comprising:

a size of at least a portion of the object to be generated;

a shape of at least the portion of the object to be generated;

a shape of at least a portion of a layer of the object;

a dimension of at least the portion of the object;

a dimension of the layer of the object;

an amount of the build material to be used to generate at least the portion of the layer of the object;

an amount of the print agent to be used to generate at least the portion of the layer of the object; and information describing at least one color of either or both of the build material and the print agent to be used to generate at least the portion of the layer of the object.

20. The non-transitory machine-readable medium of claim 16, wherein the at least one parameter comprises a parameter selected from a group comprising:

a quality of generation of the object;

a speed of the generation of the object;

a color of at least a portion of the object;

a mechanical property of at least the portion of the object;

a surface structure or texture of at least the portion of the object; and an internal structure of at least the portion of the object.

* * * * *